(12) United States Patent
Koganezawa et al.

(10) Patent No.: US 6,398,928 B1
(45) Date of Patent: Jun. 4, 2002

(54) ELECTROLYTIC OZONE GENERATING METHOD, SYSTEM AND OZONE WATER PRODUCING SYSTEM

(75) Inventors: Akihisa Koganezawa; Norikazu Takada, both of Shizuoka (JP)

(73) Assignee: Take-One Office, Ltd., Tokyo (JP)

( * ) Notice: Subject to any disclaimer, the term of this patent is extended or adjusted under 35 U.S.C. 154(b) by 0 days.

(21) Appl. No.: 09/562,433

(22) Filed: May 1, 2000

(30) Foreign Application Priority Data

Oct. 7, 1999 (JP) .............................. 11-286590

(51) Int. Cl.[7] ................................. C25B 9/08
(52) U.S. Cl. .................. 204/262; 204/265; 204/266
(58) Field of Search .................. 204/266, 278, 204/262, 265; 205/626, 701, 703; 422/186.07

(56) References Cited

U.S. PATENT DOCUMENTS 5,720,869 A * 2/1998 Yamanaka et al. .......... 205/701

* cited by examiner

*Primary Examiner*—Donald R. Valentine
*Assistant Examiner*—Thao Tran
(74) *Attorney, Agent, or Firm*—Wenderoth, Lind & Ponack, L.L.P.

(57) ABSTRACT

Service water is filtered by an active carbon pre-filter. The pre-filtered water is forced into a reverse osmosis membrane by a pump to produce pure water, and the pure water is processed to remove specific substances that consume ozone. Then, an ion-exchange resin treats a part of the low-ozone-consuming water and removes electrolytes from it to produce proper ultrapure water, which is supplied through a gas-liquid separating vessel to an electrolysis cell to produce ozone-containing gas. Another portion of the liquid in a lower space in the vessel is sent through a line to a separate temperature-controlled container. The returned liquid is mixed with the gas from the electrolysis cell by using an aspirator and ejector. Part of the high-concentration ozone water can be supplied through the temperature controlled container, a solenoid valve and a needle valve to an ozone water discharge device.

10 Claims, 2 Drawing Sheets

ELECTROLYTIC OZONE GENERATING METHOD, SYSTEM AND OZONE WATER PRODUCING SYSTEM

BACKGROUND OF THE INVENTION

1. Field of the Invention

The present invention relates to a method of generating ozone by electrolysis, an ozone generating system employing an electrolytic method and an ozone water producing system. Furthermore, in these systems or methods, the present invention relates to improvements in water utilization technologies and water modification technologies wherein the water is consumed by those electrolytic reaction or is used for other purposes.

2. Description of the Related Arts

Ozone ($O_3$) has strong oxidizing and sterilizing power and is used for deodorization and sterilization. Artificial ozone generating methods are classified into two types of methods, i.e., in-gas electric discharge methods and in-cell electrolytic methods. The former "discharge" ozone generating methods make high-voltage electricity discharged in air or in a pure oxygen atmosphere to produce ozone from a certain part of the supplied oxygen. Belonging to the latter methods, most electrolytic ozone generating methods use an electrolysis cell that employs a hydrogen ion exchange membrane (PEM, or proton exchange membrane) as a solid electrolyte for electrolysis of water. The electrolysis cell is formed by disposing, on one side of the PEM, an anode with an ozone generating catalyst, such as lead dioxide on a collecting member and, on the other side of the PEM, a hydrogen generating electrode (cathode) having platinum or the like material. Ultrapure water is supplied at 0.1 (S/cm to the anodic side in the cell, and electric current of a current density in the range of 0.5 to 2 A/cm$^2$ is passed through the electrodes. Consequently, a gas containing oxygen ($O_2$) and ozone ($O_3$) in an oxygen-to-ozone ratio of about 9:1 is produced on the side of the anode.

The "discharge" ozone generating method tends to involve problems due to generation of electromagnetic noise and production of annoying nitrogen oxides. Although any nitrogen oxides will not be produced if pure oxygen is used, cylinders for storing pure oxygen and a large-scale piping system would be required in order to utilize pure oxygen. Such large-scale facilities cannot be installed in many places. Still further, generation of electromagnetic noise is unavoidable in any of such "discharge" type methods.

Those typical problems in the "discharge" type methods are not involved in the "electrolytic" type methods. Further, location of facilities for the electrolytic ozone generating method is flexible because its primary requirements, i.e., the water supply and power supply, are easily available in many places. The electrolytic method is suitable for use in a place where many electronic devices that must be shielded from electromagnetic noise are located and where very clean sanitary environment is also required. Typical examples of such places are medical facilities including hospitals, clinics, medical laboratories, etc.

Ultrapure water has been used for the above-mentioned electrolytic ozone generation methods in recent years. If not, in other words, if many electrolytic impurities are contained in the water, the water has a high ion conductivity. Thus, electric current expected to flow from the collector through the ozone generation catalyst (i.e., lead dioxide) to the PEM skips the catalyst, and flows directly to the PEM. Consequently, ozone generating efficiency becomes poor. Further, if the water contains metal ions, such as calcium ions, the metal ions tend to combine with sulfonate groups contained in the PEM, thereby tending to deteriorate the proton conductivity of the PEM and to increase the electric current density and resistance. As a result, the electrolysis cell generates heat and, at worst, it is possible that the electrolysis cell is broken. To avoid such a effect, the electrolytic ozone generator requires a water purifying system to obtain ultrapure water.

A conventional water purifying system to produce such ultrapure water accepts service water as raw water. The system has an ion-exchange filter device connected to the service water supply passage. The ion-exchange filter device has a container packed with ion-exchange resin beads, i.e., resin beads for fixedly holding positive ions and negative ions on their surfaces. When the service water or the like water is passed through the container, electrolytes contained in the passing water are replaced with water molecules.

Generally, service water has an electrical conductivity in the range of 150 to 300 $\mu$S/cm. When purifying such raw water to produce ultrapure water of 0.1 $\mu$S/cm in electrical conductivity, the ability of the ion-exchange resin will be reduced in a short time and the ion-exchange resin must be changed after short periods. Generally, in the case of purifying service water of 150 $\mu$S/cm to produce ultrapure water of 0.1 $\mu$S/cm, the amount of raw water that can be processed through a life span of the ion-exchange resin is about 200 times the volume of the ion-exchange resin. For example, when ultrapure water is produced continuously at 100 mL/h by using 1 L of ion-exchange resin, the ion-exchange resin must be changed at intervals of about 1.5 months. Although the ion-exchange resin changing period can be extended by increasing the amount of the ion-exchange resin, a large container is necessary to contain a large amount of ion-exchange resin. As a result, the size of an ozone generator including this water purifying system increases accordingly, which involves the reduction of space efficiency and the increase of transportation cost. Needless to say, a housing for containing the large volume of ion-exchange resin will be expensive.

The conventional water purifying system has many problems in practically applying generated ozone gas to sterilization and disinfection. Generally, when ozone is used for sterilization in medical facilities, it is usual to use an ozone water producing apparatus having a mixing system connected to an ozone gas producing system to dissolve ozone gas into water. The resultant ozone water is used as cleaning medium for washing hands and the like.

Ozone water must be accurately adjusted in a proper ozone concentration so that the ozone water has effective sterilizing power and is still harmless to the human body at the time of its use. A final ozone concentration adjustment can be achieved by a diluting step. However, the final ozone concentration adjustment tends to be difficult if the ozone concentration of undiluted ozone water is unstable. Therefore, if we focus on the ozone concentration of the ozone water at the time of just being delivered from the mixing system, it is desirable that the concentration is strictly controlled. However, since ozone is a very unstable substance, it reacts readily with organic substances contained in water and decomposes into oxygen. Particularly, it is known water contains organic substances that react sensitively with ozone. We call them "ozone-consuming substances". If the raw water contains the ozone-consuming substances in a large concentration, consumption or decomposition of ozone dissolved in water is accelerated. As a result, the time for which ozone is able to stay in water is reduced. Besides, the half-life of ozone dissolved in water is shorter than that of ozone existing in gas. Therefore, in recent years, it is general to use ultrapure water as water for dissolving ozone. To suppress the consumption and decomposition of ozone as effectively as possible, it is desirable that ultrapure water has a very small organic substance concentration, not to speak of a very small electrolyte concentration. Generally, ultrapure water is required to have a conductivity in the range of about 0.01 to about 1 $\mu$S/cm and a total organic concentration (TOC) in the range of about 10 to about 50 ppb.

However, the above mentioned ion-exchange resin is unable to remove nonelectrolytes. Therefore, even using such ion-exchange resin, it still tends to be difficult to control the ozone concentration of ozone water. This difficulty depends on quality of service water (or the like raw water) which is converted into the conventional ultrapure water. Sometimes, acids produced by the interaction of ozone and organic substances deteriorates the PEM and electrodes. Therefore, conventional ozone water producing system has been requiring an expensive, large-scale water purifying system in order to reliably remove organic substances from water. This has been a factor that made miniaturization and cost reduction of the ozone water producing system very difficult.

SUMMARY OF THE INVENTION

Accordingly, it is a first object of the present invention to provide a novel electrolytic ozone gas generating method that enables the miniaturization of an ozone generating apparatus, the reduction of manufacturing cost and the reduction of running cost through the improvement of a water purifying system employed therein.

A second object of the present invention is to provide an ozone water producing system including at least an improved portion other than the ozone gas generating portion, wherein the improved portion contributes to suppression of consumption and decomposition of ozone in ozone water in ozone water storage part. This is done through an effective utilization of an electrolytic ozone generator including the improved water purifying system, and an effective utilization of raw water purified by the water purifying system (hereinafter referred to as "ozone-gas-generating raw water", the entirety of which is novel.

The inventors of the present invention developed a water purifying process including a raw water processing process using a reverse osmosis membrane (RO membrane) as a method capable of extending an ion-exchange resin maintenance cycle for the maintenance of ion-exchange resin for producing ultrapure water necessary for electrolytic ozone generation and of producing satisfactorily purified ultrapure water. The inventors of the present invention found a further fact. Water practically acceptable in capability to suppress the consumption and decomposition of ozone mixed and dissolved therein was obtained during the inventors' water purifying process, even if the general-purpose purity evaluation of the water after the purification is not as high as that of conventional ultrapure water. Such water will be called "low-ozone-consuming pure water".

The present invention has been-made on the basis of the foregoing techniques and knowledge.

A first aspect of the present invention is characterized by the following terms (1) to (5).

(1) It is a method for generating ozone comprising an electrolytic process.
(2) RO-membrane-processed pure water is produced by processing service water by a reverse osmosis membrane water purifier.
(3) Low-ozone-consuming pure water is obtained by removing as much "ozone-consuming substances" as possible from the RO-membrane-processed pure water. Such removal is achieved by specific-substance-removing means.
(4) Electrolysis raw water having an electrical conductivity in the range of 0.01 to 2.00 $\mu$S/cm is obtained by reducing electrolytes contained in the low-ozone-consuming pure water by processing the low-ozone-consuming pure water by ion-exchange resin.
(5) The electrolysis raw water is introduced into an electrolysis cell device and is subjected to electrolysis. Ozone-containing gas generated from the anodic side of the electrolysis cell is separated from the electrolysis raw water.

The specific-substance-removing means may be active carbon fibers.

According to a second aspect of the present invention, an electrolytic ozone generating system comprises a reverse osmosis membrane water purifier for processing service water to produce pure water; a specific substance-removing device that receives the pure water from the reverse osmosis membrane water purifier and removes ozone-consuming substances from the pure water to produce low-ozone-consuming pure water; an ion-exchange treatment device that receives the low-ozone-consuming pure water from the specific-substance-removing device and removes electrolytes from the low-ozone-consuming pure water in order to obtain electrolysis raw water having an electrical conductivity in the range of 0.01 to 2.00 $\mu$S/cm; an electrolysis cell device that receives the electrolysis raw water from the ion-exchange treatment device and electrolyzes the electrolysis raw water; and a gas-liquid separating vessel that separates ozone-containing gas generated from the anodic side of the electrolysis cell device from the electrolysis raw water and collects the ozone-containing gas.

In the electrolytic ozone generating system according to the second aspect of the present invention, the specific substance removing device may be a filtering device employing active carbon fibers.

The foregoing electrolytic ozone generating system may use condensed drain discharged from the reverse osmosis membrane water purifier as a heat-exchanging means for cooling the electrolysis cell device and the gas-liquid separating vessel.

According to a third aspect of the present invention, an ozone water producing system comprises, in addition to the components of the foregoing electrolytic ozone generating system, a closed gas-liquid mixing vessel, a water supply control mechanism for supplying the low-ozone-consuming pure water discharged from the specific-substance wise-removing device into the gas-liquid mixing vessel to maintain water level within suitable range so that both a gas phase and a liquid phase exist in the gas-liquid mixing vessel, a temperature control mechanism for maintaining water contained in the gas-liquid mixing vessel at a proper temperature, a ventilating mechanism for continuously introducing the collected ozone-containing gas collected by the gas-liquid separating device into the gas-liquid mixing vessel and for discharging the gas so that the pressure in the gas-liquid mixing vessel may not vary extremely, and a mixing means for continuously stirring and mixing the liquid and the gas contained in the gas-liquid mixing vessel, wherein ozone gas is dissolved in the low-ozone-consuming pure water supplied into the gas-liquid mixing vessel to obtain ozone water.

The foregoing ozone water producing system according to the third aspect of the present invention may further include an ozone water discharging mechanism for discharging the ozone water from the gas-liquid mixing vessel at a predetermined flow rate, and an ozone water diluting mechanism which supplies simply filtered service water to the ozone water on its way to be discharged by the ozone water discharging mechanism wherein such supply of the filtered water is done at a predetermined flow rate to dilute the ozone water.

In the foregoing ozone water producing system according to the third aspect of the present invention, the temperature control mechanism connected with the gas-liquid mixing vessel may use condensed drain discharged from the reverse osmosis membrane water purifying device as a heat exchanging means.

DETAILED DESCRIPTION OF THE PREFERRED EMBODIMENTS

Figure 1:
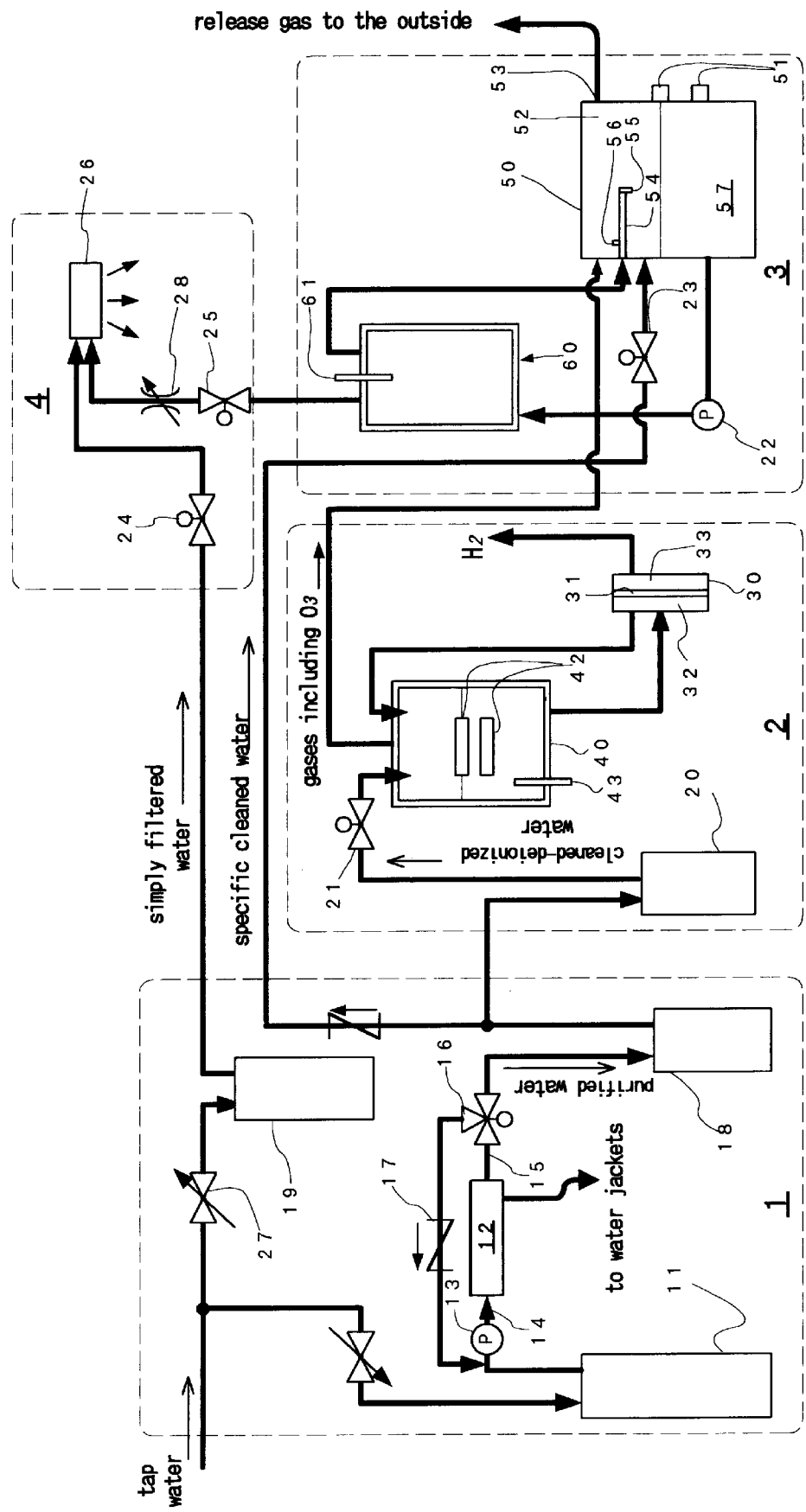
FIG. 1 is a block diagram of an ozone water producing system in a first embodiment according to the present invention for carrying out an electrolytic ozone generating method.

A first embodiment of the present invention will be described. FIG. 1 shows an ozone water producing system in a first embodiment according to the present invention in a block diagram. The ozone water producing system has a water purifying unit 1 that produces pure water (ultrapure water) of different purity grades from service water supplied thereto, an ozone generating unit 2 that generates ozone gas by electrolyzing ultrapure water supplied thereto from the water purifying unit 1, an ozone mixing unit 3 that dissolves the ozone gas in water to produce ozone water, and an ozone water supply unit 4 that dilutes the produced ozone water properly and supplies the diluted ozone water to an external user or system.

Referring to FIG. 1, service water is filtered by a prefilter 11 using active carbon. The filtered service water is supplied under pressure to a reverse osmosis membrane unit (RO membrane device) 12 by a pump 13. The reverse osmosis membrane device 12 purifies the filtered service water to provide pure water. The pure water is processed by a specific-substance-removing device to produce low-ozone-consuming pure water scarcely containing substances that consume ozone when ozone is dissolved in the low-ozone-consuming pure water. The specific-substance-removing device is an active carbon fiber filter 18. The low-ozone-consuming pure water is treated by an ion-exchange filter 20 to obtain electrolysis raw water having an electrical conductivity in the range of 0.01 to 2.00 $\mu$S/cm by reducing electrolytes contained therein.

The electrolysis raw water is supplied through a gas-liquid separating vessel 40 to an electrolysis cell device 30 for electrolysis in the ozone generating unit 2. An ozone-containing gas generated at the anodic side in the electrolysis cell is separated from the electrolysis raw water by the gas-liquid separating vessel 40.

A three-way valve 16 placed in a line connecting the RO membrane device 12 and the filter 18 is able to return part of the pure water through a one-way valve 17 to a line connecting the prefilter 11 and the pump 13 when pressure adjustment associated with the filter 18 is necessary.

In the ozone mixing unit 3, a liquid fed from a lower space of the gas-liquid mixing vessel 50 to a temperature control device 60, having undergone temperature adjustment and having returned to an upper space of the gas-liquid mixing vessel 50, is mixed with the separated ozone-containing gas. This mixing is done by using an aspirator and ejector device 54 in the upper space of the gas-liquid mixing vessel 50, which also receives low-ozone-consuming pure water from watering purifying unit 1. When an equilibrated state is almost reached by repeating these mixing and circulating operations, the liquid 57 contained in the temperature control device 60 and in the lower space of the gas-liquid mixing vessel 50 becomes a high-concentration ozone water having a set ozone concentration. Part of the high-concentration ozone water can be supplied through the temperature control device 60, a solenoid valve 25 and a needle valve 28 to an ozone water discharge device 26. Further, the tap water or service water can be simply filtered by an activated carbon filter device 19, and this simply filtered water can be supplied to the discharge device via a solenoid valve 24. Therefore, the ozone water discharge device 26 is capable of properly diluting the part of the high-concentration ozone water with the simply filtered water and can discharge the diluted ozone water. The ozone water producing system capable of thus stably supplying ozone gas or ozone water can be manufactured at a low cost, and operates at a low running cost. The components of the ozone water producing system will be individually described hereinafter.

The water purifying unit 1 includes filters and an appropriate valve mechanism, and is capable of producing pure water of a desired purity according to a purpose. The water purifying unit 1 can produce more efficient ozone-generating-purpose water and ozone-dissolving-purpose water without requiring any large-scale water purifying equipment as compared with a conventional water purifying unit. Processes to be carried out by the water purifying unit 1 to produce(ultra)pure water of different grades will be described hereinafter.

Service water supplied by a waterworks is filtered by the prefilter 11 using active carbon to produce active-carbon-filtered water. Since particles and chlorine are detrimental to the RO membrane device 12 below the prefilter 11, the prefilter 11 is used to eliminate particles and chlorine.

The RO membrane device 12 is an important element of the present invention. As is generally known, an RO membrane is a semipermeable membrane used as a filter for producing pure water. Water is supplied to the RO membrane at a pressure exceeding an associated osmotic pressure. Due to the known reverse osmosis filtering process, general impurity substances contained in the water flowing along the inlet side of the RO membrane do not pass through the RO membrane. In other words, some of the water molecules go through the RO membrane, while others can only flow along the membrane. Water molecules which went through the RO membrane and are thereby separated from the impurity substances now form the pure water which is collected into a line 15. The part of water now with thus condensed impurity substances is guided into a drain line, which can be preferably connected to at least one water jacket which will be discussed later.

In the first embodiment, the RO membrane 12 is contained in an RO membrane cartridge having the shape of a cylinder of about 5 cm in diameter and about 30 cm in length and detachably attached to a unit including a structure connecting an active-carbon-filtered water supply line 14 and a pure water supply line 15. An RO membrane filtering system including this unit is provided with the three-way valve 16 and the one-way valve 17 to return part of the produced pure water to the water supply side to maintain a membrane pressure not lower than a predetermined level.

Thus, the RO membrane water purifying device is formed by appropriately arranging filters and valve mechanisms in the water passage from the prefilter 11 via the RO membrane device 12 to the pure water supply line 15. The RO membrane water purifying process according to the first embodiment showed a remarkable ability. That is, water of 150 $\mu$S/cm became pure water of 5 $\mu$S/cm after the purification. All or part of the components of the RO membrane device may be contained in a case. In other words, according to the preferences, the RO membrane device can be provided in an appropriate form, such as an unit type, etc.

The pure water obtained by purifying water by the RO membrane device 12 is filtered by the active carbon fiber filter (postfilter) 18 to remove nonelectrolytes including organic substances by adsorption. The post-filter 18 works as an above-mentioned substance-specific removal means. The postfilter 18 includes active carbon fibers which have numerous appropriate active micro pores. Each of the appropriate active micro pores has an appropriately sized bore diameter to cause absorption power to catch target substances. Therefore, the postfilter 18 can remove ozone-consuming substances efficiently. Instead of, or in addition to, employing the active carbon filter, the role of the postfilter 18 may be accomplished by employing a suitable filtering mechanism which can correspondingly remove some ozone-consuming substances.

The pure water thus further filtered by the postfilter 18 is distributed to two water supply lines, i.e., a first line connected to the ozone generating unit 2 for ozone gas generation and a second line connected to the ozone mixing unit 3 for dissolving ozone in water. In addition to these lines for ozone generation and ozone dissolution, the water purifying unit 1 is connected to a diluting water supply line which can be connected to the ozone water supply unit 4 to dilute ozone water when the ozone water is discharged. The aforementioned simply filtered water obtained by filtering service water by an active carbon filter 19 is used as the diluting water.

The ozone generating unit 2 includes, as principal components, the electrolysis cell device 30 for producing a gas-liquid mixture containing ozone by electrolyzing ultrapure water, and the gas-liquid separating vessel 40 for separating ozone gas from the gas-liquid mixture and collecting the ozone gas.

The ultrapure water is obtained by passing the pure water filtered by the postfilter 18 of the water purifying unit 1 through the ion-exchange filter 20. The ion-exchange filter 20 refines the pure water to provide a certain kind of ultrapure water (which is to be used as "electrolysis raw water" in this invention) having an electrical conductivity in the range of 0.01 to 2 $\mu$S/cm. The electrolysis cell device 30 is formed by sandwiching a hydrogen ion exchange membrane (PEM) 31 using a fluorocarbon resin ion-exchange film as a solid electrolyte between an anode 32 and a cathode 33. The anode 32 is formed by holding lead dioxide on a porous titanium grid, and the cathode 33 is formed by plating a porous titanium grid with platinum. The cathode 33 is pressed against the PEM 31.

The ultrapure water is supplied for electrolysis to the anodic side 32 of the electrolysis cell device 30. Then, an ozone-containing oxygen gas containing oxygen and ozone in an oxygen-to-ozone ratio of 9:1 is produced. In the first embodiment, the ion-exchange filter 20, the gas-liquid separating vessel 40 and the electrolysis cell device 30 are connected by lines to introduce the ultrapure water from the ion-exchange filter 20 into the gas-liquid separating vessel 40 and to guide the ultrapure water from the gas-liquid separating vessel 40 to the electrolysis cell device 30. The ozone-containing oxygen gas generated in this electrolysis cell device and a gas-liquid mixture containing the ozone-containing oxygen gas are circulated into the gas-liquid separating vessel 40. The water level in the gas-liquid separating vessel 40 is kept fixed by a water level sensor 42 and a solenoid valve 21 controlled in accordance with the output of the water level sensor 42.

The water contained in the gas-liquid separating vessel 40 is maintained at a temperature suitable for efficient ozone generation (in the range of 5° C. to 35° C.) through the feedback control operation of a suitable heating and cooling device, including a heater or a heat exchanging medium circulator controlled by a signal provided by a thermocouple (temperature sensor) 43. The water of the regulated temperature is introduced into the electrolysis cell device 30.

Hydrogen gas produced on the side of the cathode 33 is disposed of properly. In the first embodiment, the hydrogen gas is collected by a gas-liquid separating vessel for collecting hydrogen gas, the collected hydrogen gas is burnt into steam and the steam is dissipated.

The ozone mixing unit 3 dissolves the ozone-containing oxygen gas received from the ozone generating unit 2 in water to produce ozone water having a predetermined ozone concentration. The ozone concentration of the ozone water is controlled on the basis of Henry's law. Henry's law states that "when bringing a gas into contact with a liquid to dissolve a substance (solute) in the liquid, the concentration of the substance is dependent on substances forming the solvent and the solute, the temperature of the liquid phase, the pressure of the gas phase, and the partial pressure of the solute in the gas phase, provided that the liquid and the gas are stirred and mixed well and that the dilute solution containing the solute is in equilibrium with the gas phase. The concentration increases as the temperature of the solution decreases even if the partial pressure of the solute is fixed. The concentration is proportional to the partial pressure if the temperature of the solution is fixed."

The ozone mixing unit 3 includes the closed gas-liquid mixing vessel 50, in which the ozone-containing oxygen gas received from the gas-liquid separating vessel 40 and the low-ozone-consuming purified water are stirred and-mixed. The ozone mixing unit 3 also includes the temperature control device 60 for maintaining ozone water contained in the gas-liquid mixing vessel 50 at a predetermined temperature by using a thermocouple 61 and a suitable heating and cooling device, and includes a circulating pump 22 placed in a circulation line which comprises the gas-liquid mixing vessel 50 and the temperature control device 60 for circulating the ozone water of a set temperature.

The gas-liquid mixing vessel 50 is provided with a water level sensor 51. A solenoid valve 23 placed in a line connecting the postfilter 18 of the water purifying unit 1 to the gas-liquid mixing vessel 50 operates according to the output signal of the water level sensor 51 so as to maintain a fixed water level in the gas-liquid mixing vessel 50 for a water level control operation. The ozone-containing oxygen gas introduced into a space 52 secured in the gas-liquid mixing vessel 50 by the water level control operation comes into contact with the solvent, i.e., the low-ozone-consuming pure water. Thus, some portion of ozone-containing oxygen gas in the space 52 dissolves in the low-ozone-consuming pure water, while another portion of the same is discharged through a discharge line 53. This discharged portion of the gas is passed through a decomposition catalyst device located in the line 53 before it is finally released into the atmosphere. Thus, ozone is decomposed into oxygen in such a degree that the mixture of the gas is harmless to the human body. On the other hand, extreme fluctuation of the pressure in the gas-liquid mixing vessel 50 should be avoided by carefully selecting the catalyst device of low oppression against the gas flow so as not to prevent the gas flow too much. Thus, the gas is released safely and smoothly.

The stifling and mixing mechanism employed in the first embodiment is the aspirator and ejector device 54. The device 54 jets the ozone water supplied from the temperature control device 60 through a nozzle 55 onto the surface of or into the ozone water 57 contained in the gas-liquid mixing vessel 50. The nozzle 55 has a tapered bore adapted for such jetting. As the ozone water is thus jetted, the ozone-containing oxygen gas is sucked through a gas inlet port 56 opening into the space 52. The gas is thus aspirated into the aspirator and ejector device 54 by suction produced by jetting the ozone water. Thus, the ozone water 57 is stirred continuously and ozone can be efficiently dissolved in the pure water. The ozone water thus produced is separated from the circulation line comprising the gas-liquid mixing vessel 50 and the temperature control device 60 and is supplied to the ozone water supply unit 4. In the first embodiment, both a line connected to the gas-liquid mixing vessel 50 and a line connected to the ozone water supply unit 4 are provided, each line communicating with the inside of the temperature control device's container 60.

The ozone mixing unit 3 mixes efficiently the ozone-containing oxygen gas generated by the ozone generating unit 2 in the low-ozone-consuming pure water and adjusts the ozone concentration of the ozone water 57 to a predetermined value. This concentration of the ozone water to be produced in the ozone mixing unit 3 is about 10 times as large as the ozone concentration of final ozone water to be used for sterilization or the like. This is because if the ozone concentration of the ozone water produced in the ozone mixing unit 3 were as low as the ozone concentration of the final ozone water, it would be necessary to use a large volume of the low-ozone-consuming pure water, which is more costly than the simply filtered water and can be produced at a production speed lower than that at which the simply filtered water is produced. According to the first embodiment, the ozone water supply unit 4 includes a diluting mechanism that dilutes the ozone water having a high ozone concentration to provide diluted ozone water having a desired ozone concentration. Such diluting mechanism carries out the dilution just before letting the ozone water out of the apparatus to the outside user.

More illustratively, a solenoid valve 24 is placed in a line connecting the active carbon filter 19 to the ozone water discharge device 26. Another solenoid valve 25 is placed in a line connecting the ozone mixing unit 3 to the ozone water discharge device 26. The flow rate of the simply filtered water is restricted by a pressure reducing valve 27 disposed on the upstream side of the active carbon filter 19. The flow rate of the high-concentration ozone water supplied from the ozone mixing unit 3 is restricted by the needle valve 28 disposed on the downstream side of the solenoid valve 25. The solenoid valves 24 and 25 are controlled properly for opening and closing by a photoelectric switch included in the ozone discharge device 26 to discharge the diluted ozone water having a desired ozone concentration by diluting the high-concentration ozone water. The solenoid valves 24 and 25 are controlled for opening and closing in the following mode. Only a fixed amount of the simply filtered water is discharged for preparatory washing. Subsequently, mixing of the high-concentration ozone water with the simply filtered water is started. The respective flow rates of the simply filtered water and the high-concentration ozone water are controlled so that the simply filtered water and the high-concentration ozone water are mixed properly to discharge diluted ozone water having a desired ozone concentration.

In the first embodiment, the electrolysis cell device 30 and the gas-liquid separating vessel 40 of the ozone generating unit 2, and the temperature control device 60 of the ozone mixing unit 3 are coated with water jackets, respectively. The aforementioned condensed drain drained from the RO membrane device 12 is circulated as a heat exchanging medium in through the water jackets in order to present a simple cooling mechanism and to save cooling water.

The performance of the ozone water producing system in the first embodiment was evaluated as follows.

(1) Maintenance

Service water is changed into pure water of 5 $\mu$S/cm by the RO membrane device. Therefore, according to a simple calculation, the water processing speed of the RO membrane device is thirty times as high as a water processing speed at which an ion-exchange treatment device converts service water of 150 $\mu$S/cm directly into ultrapure water. Thus, an ion-exchange resin changing period at which the ion-exchange resin of this embodiment needs be changed is thirty times as long as the ion-exchange resin changing period at which an ion-exchange resin of an ion-exchange treatment device included in the conventional ozone water producing system must be changed.

(2) Ozone Dissolution and Ozone Preservation

The low-ozone-consuming pure water, i.e., a solvent for dissolving ozone therein, is a characteristic element of the present invention. The low-ozone-consuming pure water has ozone dissolving power comparable to that of a conventionally used very highly pure water (ultrapure water) and even extends the half-life of ozone dissolved therein. Further, very advantageously, the water purifying system to obtain the low-ozone-consuming pure water of the present invention is compact and inexpensive. In the ozone water producing system in the first embodiment, the ratio of the measured ozone concentration of the ozone-containing oxygen gas supplied into the gas-liquid mixing vessel 50 to that of the ozone-containing oxygen gas discharged from the gas-liquid mixing vessel 50 was 100 to 98, which shows only 2% difference, which is sufficiently small. This is considered to be an evidence that the dissolution of ozone and the discharge of ozone are stably equilibrated.

The ozone concentration of the ozone water 57 in vessel 50 of this embodiment reached 65 ppm, which is almost equal to that of comparative ozone water conventionally prepared by dissolving ozone in conventional ultrapure water. For stability evaluation of the ozone concentration after the ozone water production of 65 ppm of this embodiment, the ozone water 57 thus produced was further stored in a closed vessel at 4° C. for 24 hours. Its ozone concentration was then measured. The result was as high as 40 ppm.

As is clear from the foregoing description, the ozone producing method according to the present invention converts service water into pure water by the RO membrane device, removes specific impurity components of the pure water, and then produces a kind of ultrapure water by an ion-exchange process. The resultant ultrapure water is electrolyzed to generate ozone. This water purifying process enables a small amount of ion-exchange resin to supply ultrapure water with reliability for a long period. Therefore, the overall electrolytic ozone generator can be formed in a compact construction at a low initial cost. Further, it is able to operate at a significantly reduced running cost.

If active carbon fibers are employed as means for removing the specific substances, the impurity substances can be efficiently removed. Moreover, since active carbon fibers are inexpensive, the cost of the pure water can be further reduced.

The pure water obtained by removing the specific components from the filtered water is the low-ozone-consuming pure water that reduces ozone consumption and decomposition rates. Therefore, ozone contained in the ozone water prepared by dissolving ozone in the low-ozone-consuming pure water has a very long half-life. Therefore, the low-ozone-consuming pure water is a novel and good solution for the short half-life problem during storage or reservation of conventional ozone water.

Advantageously, the ozone water producing system of this embodiment can dilute the inner reserved ozone water (57) with the simply filtered water (from the valve 24). This dilution is immediately before the inner reserved ozone water is discharged to the outside. In this configuration, useful low-concentration ozone water, for human sterilization or the like, can be prepared just before usage. In such situations, it may not be necessary to secure long half-life of the low-concentration ozone water. Therefore, the above configuration makes it unnecessary to use any of the RO purified water, the specific cleaned low-ozone-consuming water and the cleaned-deionized water (see FIG. 1) in order to dilute the ozone water for such purposes, that is, in many situations. Thus, the low-ozone-consuming water and the cleaned-deionized water can be saved and efficiently used in their respective essential target steps, i.e., the ozone water mixing-producing-reservation step and the ozone generation step. This is a big advantage because these special kinds of waters are produced at low production speeds that are lower than the speed at which the simply filtered water can be produced.

In general facilities, drainage water coming from general RO membrane devices contains condensed impurity substances and is thrown away. However, according to the above embodiment, such drainage water is used as a heat exchanging medium, i.e., cooling water, for the temperature control of the electrolysis cell device and/or the gas-liquid separating vessel, and/or the gas-liquid mixing vessel. Consequently, the consumption of service water can be reduced, which further reduces the corresponding running cost of the ozone generating system or the ozone water producing system.

Figure 2:
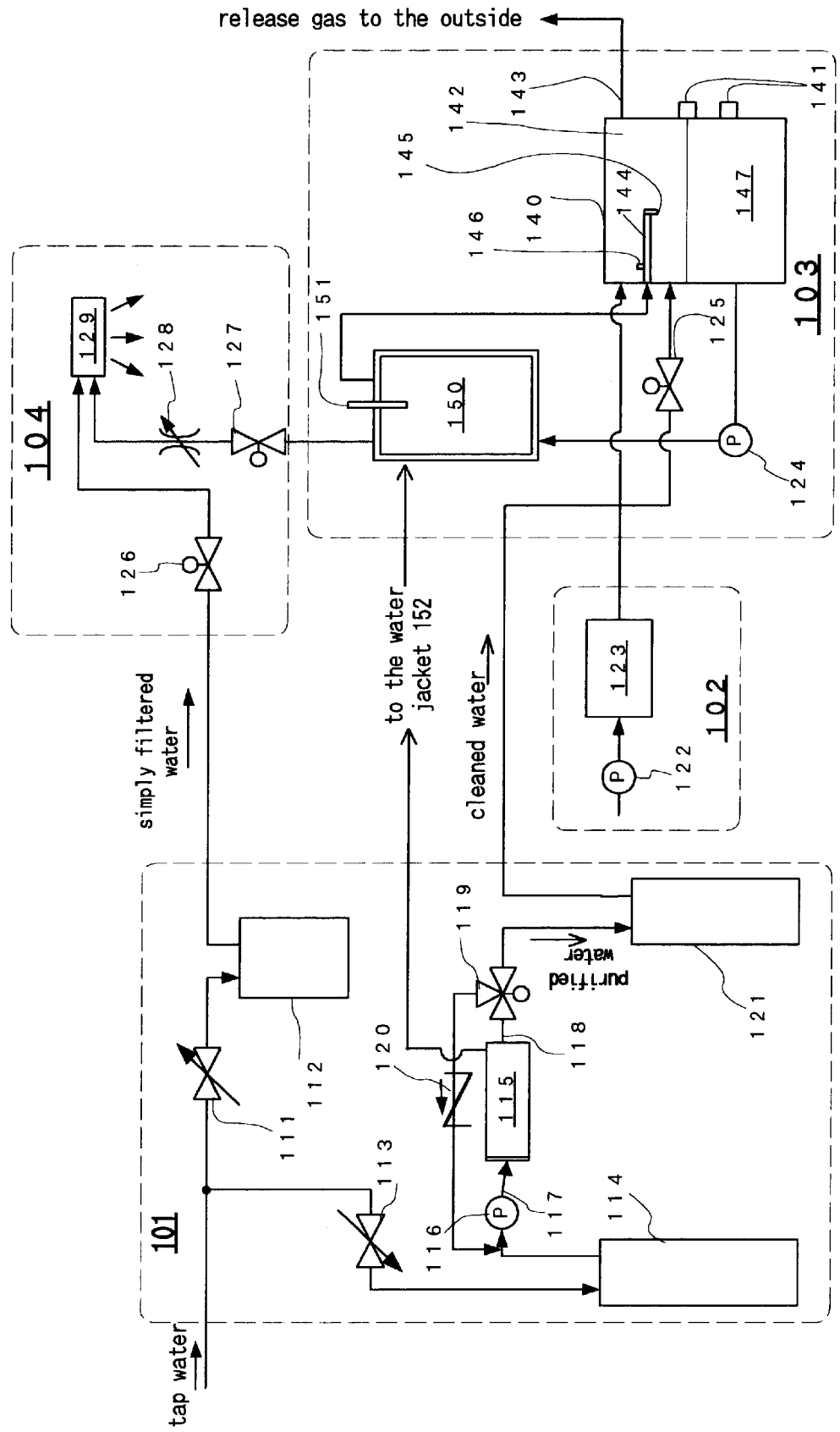
FIG. 2 is a block diagram of an ozone water producing system in a second embodiment according to the present invention.

FIG. 2 is a block diagram of an ozone water producing system in a second embodiment according to the present invention. This ozone water producing system has a water purifying unit 101 that produces pure water for dissolving ozone from service water supplied thereto, an ozone generating unit 102 that generates ozone gas, an ozone mixing unit 103 that dissolves the ozone gas in the ozone dissolving water to produce ozone water, and an ozone water supply unit 104 that dilutes the ozone water properly and supplies the diluted ozone water to an external user or system.

The water purifying unit 101 uses service water supplied by a waterworks as raw water and has water purifying circuits respectively for producing ozone dissolving water (low-ozone-consuming pure water) by removing ozone consuming substances from service water, and for producing simply filtered water to be used for diluting ozone water immediately before the final discharge of the ozone water. A line connected to the waterworks is branched to those water purifying circuits.

The simply filtered water is produced by passing service water through a pressure reducing valve 111 for flow regulation and an active carbon filter device 112. On the other hand, the low-ozone-consuming pure water is produced by the following water purifying process.

The flow of service water supplied by the waterworks is regulated by a pressure reducing valve 113, the service water is filtered by an active carbon prefilter 114 to produce active-carbon-filtered water. Particles and chlorine are detrimental to an RO membrane device 115 disposed below the prefilter 114, which is provided for removing particles and chlorine. The active-carbon-filtered water filtered by the prefilter 114 is forced into the RO membrane device 115 by a pump 116 to produce pure water. The pure water is filtered by an active carbon post filter 121 to produce low-ozone-consuming pure water.

The RO membrane device 115 is an important element of the present invention. As is generally known, a RO membrane is a semipermeable membrane used as a filter for producing pure water. Water is supplied to the RO membrane at a pressure exceeding an associated osmotic pressure. The reverse osmosis filtering process makes pure water molecules go through the RO membrane and separates these water molecules away from some impurity substances contained in the supplied water. According to this embodiment, those impurity substances from and passing the pre-filter 114 are condensed in the draining water which have come along the RO membrane device 115 but could not flow through the RO membrane. Such draining water containing the condensed impurity substances is sent out into the water jacket 150 as shown in FIG. 2.

In the second embodiment, the RO membrane device 115 is contained in a cartridge having the shape of a cylinder of about 5 cm in diameter and about 30 cm in length and detachably attached to an RO membrane unit including a connecting mechanism connecting an active-carbon-filtered water supply line 117 and the pump 116, an active-carbon-filtered water supply line 117 and a pure water supply line 118. An RO membrane filtering system including this unit is provided with a three-way valve 119 and a one-way valve 120 to return part of the produced pure water to the pump 116 to maintain a membrane pressure not lower than a predetermined level.

Thus, the RO membrane water purifying device is formed by properly arranging filters and valve mechanisms on the water passage from the prefilter 114 via the RO membrane device 115 to the pure water supply line 118. The second embodiment carries out an RO membrane water purifying process to purify water of 150 (S/cm in electrical conductivity into pure water of 5 $\mu$S/cm in electrical conductivity by the RO membrane device 115. All or part of the components of the RO membrane device 115 may be contained in a case.

The pure water obtained by purifying water by the RO membrane device 115 is filtered by the active carbon post-filter 121 to remove nonelectrolytes including organic substances by adsorption. The postfilter 121 includes active carbon fibers having appropriate active bore diameters. Therefore, the postfilter 121 can remove ozone-consuming substances efficiently. The postfilter 121 may be provided with any other suitable filtering mechanism capable of removing ozone-consuming substances instead of the active carbon fibers.

The low-ozone-consuming pure water thus produced is supplied as ozone dissolving water to the ozone mixing unit 103.

The ozone generating unit 102 includes an air pump 122 and a "discharge-type" (discharge) ozone generator 123. The ozone generator 123 is placed in an air supply line which supplies air pumped by the air pump 122 to the ozone mixing unit 103. The discharge ozone generator 123 passes high-voltage discharge through a raw gas, such as dry air or pure oxygen, to convert part of the oxygen contained in the raw gas into ozone. Thus, ozone is generated. In this second embodiment, air pumped by the air pump 122 is dehumidified by cooling the same or passing the same through a pipe packed with a desiccant. Dried air thus obtained is used for generating ozone.

The ozone mixing unit 103 carries out an ozone water producing process which dissolves an ozone-containing gas supplied thereto from the ozone generating unit 102 in the low-ozone-consuming pure water to produce ozone water having a predetermined ozone concentration. The second embodiment also controls the ozone concentration of the ozone water on the basis of Henry's Law.

The ozone mixing unit 103 includes a closed gas-liquid mixing vessel 140 in which the ozone-containing gas received from the ozone generating unit 102 and the low-ozone-consuming pure water are mixed and stirred to produce ozone water, a temperature control device 150 for controlling the temperature of the ozone water contained in the gas-liquid mixing vessel 140 by an arrangement including a thermocouple 151 and a suitable heating and cooling device, and a circulating pump 124 placed in a line connecting the gas-liquid mixing vessel 140 to the temperature control device 150 to circulate the ozone water.

The gas-liquid mixing vessel 140 is provided with a water level sensor 141. A solenoid valve 125 placed in a line connecting the postfilter 121 of the water purifying unit 101 to the gas-liquid mixing vessel 140 operates according to the output signal of the water level sensor 141 so as to maintain a fixed water level in the gas-liquid mixing vessel 140 for a water level control operation. The ozone-containing gas introduced into a space 142 secured in the gas-liquid mixing vessel 140 by the water level control operation comes into contact with the solvent, i.e., the low-ozone-consuming pure water, and the ozone-containing gas that has not been dissolved in the low-ozone-consuming pure water is discharged through a discharge line 143 so that pressure in the gas-liquid mixing vessel 140 may not extremely vary. When necessary, the ozone-containing gas is subjected to a suitable decomposing and detoxicating process before discharging the same into the atmosphere.

An aspirator and ejector device 144 is used as a stirring and mixing mechanism. The device 144 jets the ozone water supplied from the temperature control device 150 through a nozzle 145 onto the surface of or into the ozone water 147 contained in the gas-liquid mixing vessel 140. As the ozone water is thus jetted, the ozone-containing gas is sucked through a gas inlet port 146 opening into the space 142 into the device 144 by suction produced by jetting the ozone water. Thus, the ozone water 147 is stirred continuously and ozone can be efficiently dissolved in the solvent. The ozone water thus produced is separated from the circulation line between the gas-liquid mixing vessel 140 and the temperature control device 150 and is supplied to the ozone water supply unit 104. In the second embodiment, a line connected to the gas-liquid mixing vessel 140 and a line connected to the ozone water supply unit 104 are extended from the temperature control device 150.

The ozone mixing unit 103 efficiently mixes the ozone-containing gas generated by the ozone generating unit 102 in the low-ozone-consuming pure water and adjusts the ozone concentration of the ozone water to a predetermined value. The ozone concentration of the ozone water produced in the ozone mixing unit 103 is about 10 times as large as the ozone concentration of final ozone water to be used for sterilization or the like. If the ozone concentration of the ozone water produced in the ozone mixing unit 103 were to be as small as the ozone concentration of the final ozone water, it would have been necessary to use a large amount of the low-ozone-consuming pure water which is more costly than the simply filtered water and which is produced at lower production speed than that at which the simply filtered water is produced. The ozone water supply unit 104 includes a diluting mechanism that dilutes the ozone water having a high ozone concentration to provide diluted ozone water having a desired ozone concentration, immediately before discharging the ozone water having a desired ozone concentration.

To be more precise, a solenoid valve 126 is placed in a line for carrying the simply filtered water to an ozone water discharge device 129 and a solenoid valve 127 is placed in a line connecting the ozone mixing unit 103 to the ozone water discharge device 129. The flow rate of the simply filtered water is restricted by a pressure reducing valve 111 disposed on the upstream side of the active carbon filter 112. The flow rate of the high-concentration ozone water supplied from the ozone mixing unit 103 is restricted by a needle valve 128 disposed on the downstream side of the solenoid valve 127. In the second embodiment, a photoelectric switch that generates a predetermined signal upon the detection of the human hand or the like is disposed near the ozone water discharge device 129 to make touching the ozone water discharge device 129 unnecessary when using the ozone water. The solenoid valves 126 and 127 are controlled properly for opening and closing by the output signal of the photoelectric switch to dilute the high-concentration ozone water to produce diluted ozone water and to discharge the diluted ozone water having a desired ozone concentration. The solenoid valves 126 and 127 are controlled for opening and closing in the following mode. Only a fixed amount of the simply filtered water is discharged for preparatory washing. Subsequently, mixing of the high-concentration ozone water in the simply filtered water is started. The respective flow rates of the simply filtered water and the high-concentration ozone water are controlled so that the simply filtered water and the high-concentration ozone water are mixed properly to discharge diluted ozone water having a desired ozone concentration.

In the second embodiment, the temperature control device 150 of the ozone mixing unit 103 is coated with a water jacket 152. The condensed drain drained from the RO membrane device 115 is circulated as a heat exchanging medium through the water jacket 152 to simplify the cooling mechanism and to save cooling water.

The low-ozone-consuming pure water as a solvent for dissolving ozone therein, has ozone dissolving power comparable to that of a very highly pure, conventional ultra pure water. In fact, it extends the half-life of ozone dissolved therein. Further, the low-ozone-consuming pure water can be produced by a compact water purifying system and is inexpensive.

Measured results of tests for evaluating the performance of the ozone water producing system in the second embodiment will be briefly described. The ratio of measured ozone concentration of the ozone-containing oxygen gas discharged from the gas-liquid mixing vessel 140 as compared to measured ozone concentration of the ozone-containing oxygen gas supplied into the gas-liquid mixing vessel 140 was 0.98, which proved that the dissolution of ozone and the discharge of ozone are stably equilibrated. The ozone concentration of the equilibrated ozone water was 65 ppm, which is substantially equal to the ozone concentration of ozone water prepared by dissolving ozone in conventional ultra pure water. The ozone water which had been produced in the gas-liquid mixing vessel 50 was then stored in a closed vessel at 4° C. for 24 h. Then it was measured and showed the ozone concentration of as high as 40 ppm.

In the second embodiment, ozone is generated by electric discharge in air containing oxygen. Ozone may be generated by using pure oxygen supplied from an oxygen cylinder. An electrolytic ozone generating method may be used for generating ozone instead of the "high-voltage-discharge type" ozone-generating method by which this second embodiment generates ozone. Typically, an electrolysis cell device that uses a hydrogen ion exchange membrane (PEM) as a solid electrolyte for water electrolysis can be employed. The electrolysis cell device is formed by sandwiching a PEM between an anode formed by holding an ozone generating catalyst, such as lead dioxide, on a collecting grid and a hydrogen generating electrode (cathode) formed by plating a grid with platinum. Generally, ultrapure water of about 0.1 $\mu$S/cm in electrical conductivity is supplied to the electrolysis cell device. The water purifying unit 101 may be provided, in addition to the low-ozone-consuming circuit, a ultrapure water producing device including an ion-exchange filter. An ozone-containing gas produced by the electrolysis cell device may be collected by a gas-liquid separating vessel and the ozone-containing gas may be supplied to the ozone mixing unit 103.

As is apparent from the foregoing description, the second embodiment converts service water into pure water by the RO membrane device and produces ozone dissolving water by removing specific components of the pure water. The pure water obtained by removing the specific components from the filtered water is low-ozone-consuming pure water that reduces ozone consumption and decomposition rates. Accordingly, any expensive, large-scale water purifying system for producing ultrapure water is not necessary, and the low-ozone-consuming pure water can be produced by an inexpensive, compact water purifying system at a low cost. Ozone contained in the ozone water prepared by dissolving ozone-containing gas in the low-ozone-consuming pure water has a very long half-life, and the low-ozone-consuming pure water is one of the measures for solving problems in storing ozone water.

Since the active carbon fibers employed in the second embodiment for removing the specific substances are inexpensive, the low-ozone-consuming pure water can be produced at a reduced cost.

In the second embodiment, the ozone water is diluted with the simply filtered water immediately before discharging the low-concentration ozone water for sterilization or the like. Therefore the low-ozone-consuming pure water, which is produced at a low production speed, need not be used for diluting the ozone water. It can be efficiently used for producing ozone water.

In the second embodiment, the condensed drain water from the RO membrane device, which used to be thrown away in conventional configurations, is effectively used as a heat exchanging medium. More concretely, the condensed drain is used as cooling water for the temperature control of the gas-liquid mixing vessel. Consequently, the consumption of service water can be reduced, which further reduces the running cost of the ozone water producing system.

What is claimed is:

1. An electrolytic ozone generating system comprising:
   a reverse osmosis membrane water purifier for processing service water to produce pure water and to discharge drain water;
   a specific-substance-removing device for receiving the pure water from said purifier and for removing ozone consuming substances from the pure water to produce low-ozone-consuming water;
   a treatment device including an ion-exchange resin and for receiving the low-ozone-consuming water from said specific-substance-removing device and for removing electrolytes from the low-ozone-consuming water to produce electrolysis-raw water having an electrical conductivity in the range of 0.01 to 2.00 $\mu$S/cm;
   an electrolysis cell device for receiving the electrolysis-raw water from said treatment device and for electrolyzing the electrolysis-raw water, said electrolysis cell device including an anode for producing a gas-liquid mixture including ozone-containing gas;
   a gas-liquid separating vessel for separating the gas-liquid mixture received from said electrolysis cell to produce the electrolysis-raw water and the ozone-containing gas, and for collecting the ozone-containing gas; and
   a heat-exchanging device for cooling at least one of said electrolysis cell device and said gas-liquid separating vessel, said purifier being connected to said heat exchanging device such that the drain water discharged from said purifier is supplied to said heat exchanging device to be used as a heat-exchanging medium in said heat-exchanging device for cooling said at least one of said electrolysis cell device and said gas-liquid separating vessel.

2. An ozone water producing system comprising:
   said electrolytic ozone generating system according to claim 1;
   a closed gas-liquid mixing vessel;
   a water supply control mechanism for supplying the low-ozone-consuming water produced by said specific-substance-removing device into said gas-liquid mixing vessel to maintain a water level in said gas-liquid mixing vessel so that both a gas phase and a liquid phase exist in said gas-liquid mixing vessel;
   a temperature control mechanism for maintaining the water contained in said gas-liquid mixing vessel at a proper temperature;
   a ventilating mechanism for continuously introducing the ozone-containing gas collected by said gas-liquid separating device into said gas-liquid mixing vessel and for discharging gas so as to prevent extreme pressure fluctuations in said gas-liquid mixing vessel; and
   a mixing mechanism for continuously stirring and mixing the liquid and the gas contained in said gas-liquid mixing vessel so as to dissolve ozone gas in the low-ozone-consuming water supplied into said gas-liquid mixing vessel to produce ozone water.

3. The ozone water producing system according to claim 2, wherein said temperature control mechanism is connected with said gas-liquid mixing vessel and said reverse osmosis membrane water purifier such that the drain water discharged from said reverse osmosis membrane water purifier is supplied to said temperature control mechanism to be used as a heat exchanging medium.

4. The ozone water producing system according to claim 2, further comprising:
an ozone water discharging mechanism for discharging the ozone water received from said gas-liquid mixing vessel at a predetermined flow rate; and
an ozone water diluting mechanism for supplying simply filtered service water to said ozone water discharging mechanism at a predetermined flow rate, and for mixing the simply filtered service water with the ozone water to be discharged from said ozone water discharging mechanism so as to dilute the ozone water.

5. The ozone water producing system according to claim 4, wherein said temperature control mechanism is connected with said gas-liquid mixing vessel and said reverse osmosis membrane water purifier such that the drain water discharged from said reverse osmosis membrane water purifier is supplied to said temperature control mechanism to be used as a heat exchanging medium.

6. The electrolytic ozone generating system according to claim 1, wherein said specific-substance-removing device comprises a filtering device including active carbon fibers.

7. An ozone water producing system comprising:
said electrolytic ozone generating system according to claim 6;
a closed gas-liquid mixing vessel;
a water supply control mechanism for supplying the low-ozone-consuming water produced by said specific-substance-removing device into said gas-liquid mixing vessel to maintain a water level in said gas-liquid mixing vessel so that both a gas phase and a liquid phase exist in said gas-liquid mixing vessel;
a temperature control mechanism for maintaining the water contained in said gas-liquid mixing vessel at a proper temperature;
a ventilating mechanism for continuously introducing the ozone-containing gas collected by said gas-liquid separating device into said gas-liquid mixing vessel and for discharging gas so as to prevent extreme pressure fluctuations in said gas-liquid mixing vessel; and
a mixing mechanism for continuously stirring and mixing the liquid and the gas contained in said gas-liquid mixing vessel so as to dissolve ozone gas in the low-ozone-consuming water supplied into said gas-liquid mixing vessel to produce ozone water.

8. The ozone water producing system according to claim 7, wherein said temperature control mechanism is connected with said gas-liquid mixing vessel and said reverse osmosis membrane water purifier such that the drain water discharged from said reverse osmosis membrane water purifier is supplied to said temperature control mechanism to be used as a heat exchanging medium.

9. The ozone water producing system according to claim 7, further comprising:
an ozone water discharging mechanism for discharging the ozone water received from said gas-liquid mixing vessel at a predetermined flow rate; and
an ozone water diluting mechanism for supplying simply filtered service water to said ozone water discharging mechanism at a predetermined flow rate, and for mixing the simply filtered service water with the ozone water to be discharged from said ozone water discharging mechanism so as to dilute the ozone water.

10. The ozone water producing system according to claim 9, wherein said temperature control mechanism is connected with said gas-liquid mixing vessel and said reverse osmosis membrane water purifier such that the drain water discharged from said reverse osmosis membrane water purifier is supplied to said temperature control mechanism to be used as a heat exchanging medium.

\* \* \* \* \*